Nov. 11, 1952  S. B. COHN  2,617,936
DELAY LENS FOR MICROWAVES
Filed Jan. 11, 1949  3 Sheets—Sheet 1

INVENTOR
SEYMOUR B. COHN
BY
Herbert N. Thompson
HIS ATTORNEY

Nov. 11, 1952 S. B. COHN 2,617,936
DELAY LENS FOR MICROWAVES
Filed Jan. 11, 1949 3 Sheets-Sheet 2

INVENTOR
SEYMOUR B. COHN
BY
HIS ATTORNEY

Nov. 11, 1952    S. B. COHN    2,617,936
DELAY LENS FOR MICROWAVES
Filed Jan. 11, 1949    3 Sheets-Sheet 3

INVENTOR
SEYMOUR B. COHN
BY
HIS ATTORNEY

Patented Nov. 11, 1952

2,617,936

UNITED STATES PATENT OFFICE 2,617,936

DELAY LENS FOR MICROWAVES

Seymour B. Cohn, Garden City, N. Y., assignor to
The Sperry Corporation, Great Neck, N. Y., a
corporation of Delaware Application January 11, 1949, Serial No. 70,317

15 Claims. (Cl. 250—33.63)

This invention relates to ultra-high frequency delay lenses and more particularly to improved methods and means for designing and constructing such lenses.

Delay lenses, constructed previously, have their designs based on the analogy between light transmission and the quasi-optical properties of microwave energy. However, the design equations derived from this theory of attack are approximations and are not as accurate as may be desired.

Accordingly, a principal object of the present invention is to provide an improved lens for ultra-high frequencies.

Another object of the invention is to provide an ultra-high frequency lens which is impedance matched to space.

Another object of the present invention is to provide a microwave lens with minimum reflection over a wide band.

Another object of the present invention is to provide a microwave lens that is susceptible to analysis by filter theory.

Another object is to provide a microwave lens with filter properties.

The present invention is an improved microwave lens medium whose impedance is matched to space, which is an improvement over the prior art. It is derived by an analysis of the lens as a low-pass filter, by the application of microwave filter theory. This is an entirely new approach to the problem, the design of prior lenses having been dependent upon the analogy between optical phenomena and the quasi-optical properties of microwave energy.

It will be shown that the present invention provides an improved lens based on a rigorous analysis according to microwave filter theory. The metal-strip delay lens will be shown to be equivalent to a transmission-line low-pass filter. A filter analysis then gives the image phase constant and image admittance of the equivalent filter section. The index of refraction of the medium is then obtained from the former and the reflection coefficient from the latter. It will also be shown that the physical parameters may be chosen so that the strip medium is perfectly matched to space at a particular frequency, and fairly well matched over a broad frequency range.

The invention will be explained in conjunction with the following figures of which:

Figs. 3B and 3C represent a transmission line section.

Fig. 1A shows a top view of a typical microwave lens of the prior art which comprises a series of parallel strips 1 of conductive material arranged in spaced vertical planes. Fig. 1B shows the side view of the lens.

Figure 1C:
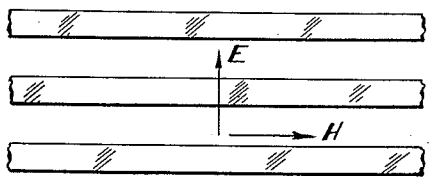
Figs. 1A, 1B, 1C and 1D represent a typical lens for microwave energy.
Figure 1D:
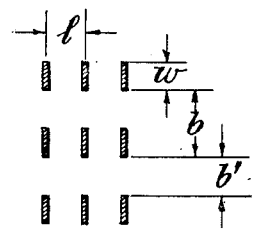
Figure 1B:
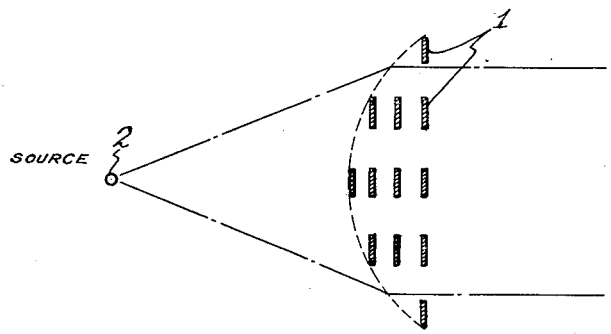
Figure 1A:
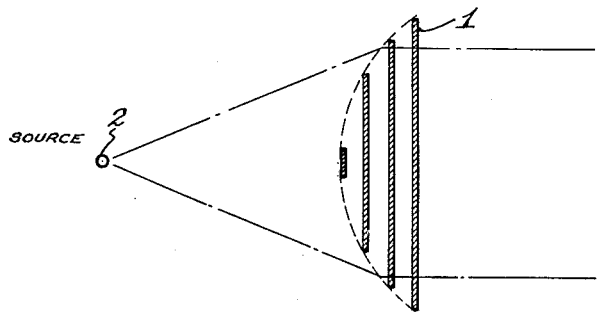

Fig. 1C is a detail drawing, showing the relationship of the strips to the electric vector E and the electromagnetic vector H. Since the electric vector is normally vertical we will refer to its direction as vertical in this discussion. The side view of Fig. 1D illustrates the cross-sectional spacing of the conductive strips 1 showing the horizontal spacing $l$ and the vertical spacing $b$. It may be shown that such a configuration (Fig. 1A) of parallel conductive strips can focus energy fed to it from energy source 2.

Figure 2A:
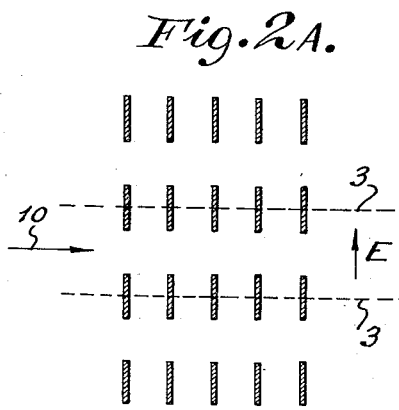
Fig. 2A represents a typical lens structure.

Referring to Fig. 2A there is shown a partial cross section of a typical lens structure showing the parallel strips, the direction of energy travel 10 and the direction of the electric vector E.

Figure 2B:
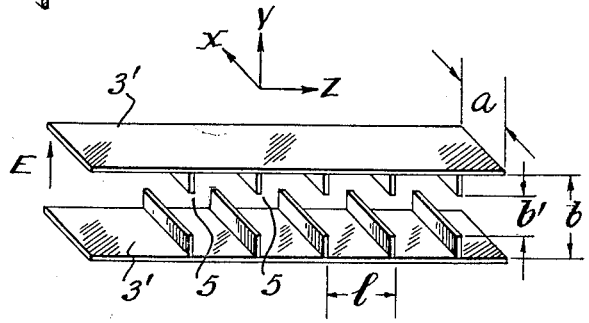
Fig. 2B represents the equivalent transmission line of Fig. 1.

If normal incidence to a plane strip-lens surface is assumed, the dotted planes 3 shown in Figure 2A will be everywhere perpendicular to the electric field and parallel to the magnetic field. Thin conducting sheets 3' may therefore be placed in the dotted planes without altering the electromagnetic field. The portion of the lens thus isolated is shown in Figure 2B, where a constant width $a$ in the $x$ direction is assumed. The discontinuity resulting from limiting the $x$-direction width in this manner may be neglected if $a$ is very much larger than $b$.

Figure 2B represents a parallel-strip transmission line loaded by a succession of shunt capacitive irises 5. The characteristic impedance of this transmission line is equal to that of free space; that is, if $a$ were equal to $b$, the characteristic impedance would be $120\pi$ ohms, which is the characteristic impedance of free space per square unit. In the following discussion, all impedances are normalized with respect to the transmission-line characteristic impedance, and hence the impedance of free space is taken as unity.

Figure 3A:
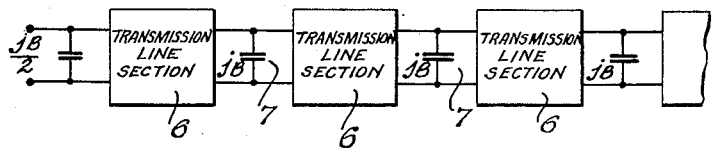
Fig. 3A shows schematic equivalent circuits representing the transmission line of Fig. 2 as a series of filter sections.

The equivalent circuit of Figure 2B is shown in Figure 3A. The blocks 6 represent lengths of transmission line having $Z_0=1$ loaded by capacitances 7, having susceptance B. This circuit may be regarded as a filter; one section of which is shown in Figure 3B. From the solution of the single section, one may obtain all the properties of the cascade of sections of Figure 3A, and hence all the properties of the strip lens structure of Figure 2A for normal incidence. Note that when a number of filter sections are connected in cascade, the first and last iris must have half the susceptance of the inner irises.

Figure 3B represents a transmission-line low-pass filter section which has been previously analyzed in "Very High Frequency Techniques," Radio Research Laboratory Staff, McGraw-Hill, New York 1947, p. 659–660. The image parameters of a single section as given by "Very High Frequency Techniques," are, after simplification, $$Y_I = \sqrt{1 + B \cot \varphi - \frac{B^2}{4}} \qquad (1)$$

$$\beta = \cos^{-1}\left\{\cos \varphi - \frac{B}{2} \sin \varphi\right\} \qquad (2)$$

where:

$Y_I$ is the image admittance and
$\beta$ the image phase constant of the filter section. ($Y_I$ is the reciprocal of image impedance $Z_I$)
$B$ is the normalized shunt susceptance of a capacitive iris, and
$\varphi$ is phase length defined by $$\varphi = \frac{2\pi l}{\lambda} \text{ radians} = \frac{360\, l}{\lambda} \text{ degrees} \qquad (3)$$

The index of refraction is given by the phase shift of a particular length of delay structure divided by the phase shift of the same length of free space. That is $$\eta = \frac{\beta}{\varphi} \qquad (4)$$

or $$\eta = \frac{1}{\varphi} \cos^{-1}\left\{\cos \varphi - \frac{B}{2} \sin \varphi\right\} \qquad (5)$$

The normalized shunt susceptance B of a thin, isolated capacitive iris, where the ratio $b/\lambda$ is small is (Figure 3c)

$$B = 4 \frac{b}{\lambda} \log_e \csc \frac{\pi b'}{2b} \qquad (6)$$

The irises may be considered isolated if $b$ is less than $l$.

Equation 6 holds fairly well for $b/\lambda$ up to 0.2 or so. For $b/\lambda$ greater than 0.2 the exact formula for a thin, isolated capacitive iris may be used.

Figure 4:
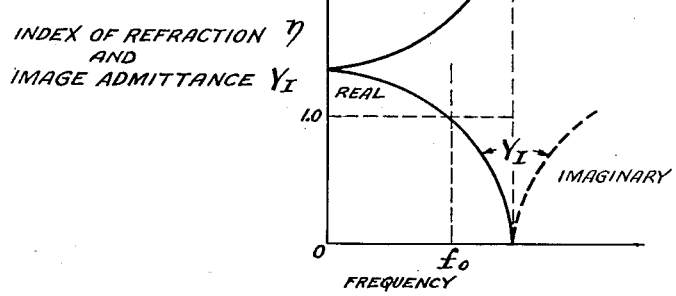
Fig. 4 is a graph explanatory of the invention.

The index of refraction and image admittance are sketched versus frequency in Figure 4. As explained in Very High Frequency Techniques, supra, filter pass bands occur for $Y_I$ real, and stop bands for $Y_I$ imaginary. The former case corresponds to a transparent lens medium, and the latter to an opaque medium. Additional pass bands occur at higher frequencies than are shown in Figure 4, but they are usually of little interest in lens design. The lens media may be designed if so desired to act as a wave filter, in order to pass and reject certain bands of frequencies.

The reflection coefficient for a wave entering the lens medium is, according to filter or transmission line theory $$r = \frac{1 - Y_I}{1 + Y_I} \qquad (7)$$

For an emerging wave, it is minus this quantity. The combined reflection coefficient of a medium of finite thickness may be greater or less than this depending on the phase length between the front and back surfaces.

Figure 4 shows that a frequency $f_0$ exists at which $Y_I$ of the lens medium is unity. By Equation 7 the reflection coefficient $\gamma$ is zero for this condition, and there will be no reflection at normal incidence. This is the desired condition.

If $Y_I$ is set equal to one in Equation 1 the following condition results.

$$B_0 = 4 \cot \varphi_0 \qquad (8)$$

The subscript "0" denotes values at $f_0$, the frequency of zero reflection. If Equation 8 is substituted in Equation 2, one obtains $$\beta_0 = \cos^{-1}\left[\cos \varphi_0 - \frac{4 \cot \varphi_0}{2} \sin \varphi_0\right]$$
$$= \cos^{-1}(-\cos \varphi_0)$$
$$\beta_0 = \pi - \varphi_0 \text{ radians} = 180 - \varphi_0 \text{ degrees} \qquad (9)$$

Hence $$\eta_0 = \frac{180}{\phi_0} - 1 \qquad (10)$$

where $\phi_0$ is in degrees.

Equation 5 indicates that $\eta$ the index of refraction is a function of frequency. In order to ascertain the width of the frequency band near the operation point $f_0$ for which the change in $\eta$ is small, the dispersion of the index of refraction, D, will be calculated. This quantity is defined as $$D = f \frac{d\eta}{df} = \varphi \frac{d\eta}{d\varphi} \qquad (11)$$

Therefore the change in $\eta$ is equal to D times the fraction change in $f$. This may be found to be $$D = 2 \csc^2 \varphi_0 + \frac{2 \cot \varphi_0 - \pi}{\varphi_0} \qquad (12)$$

As an example, for $\phi_0 = 75°$, $D = 0.153$, and over a 10-percent frequency band, the change in $\eta$ is not more than 0.0153.

Figure 5:
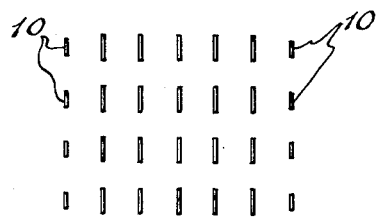
Fig. 5 represents a cross section of a lens having the surface elements smaller in width according to the invention.

According to the above filter analysis, the strips at the front and back surfaces of the lens should have half the susceptance of the inner ones, since in the end filter sections the unconnected susceptance is one-half the internal susceptances which are the sum of the susceptances of two adjacent filter sections. An edge view of the lens media will therefore be as shown in Figure 5, where the matching strips 10 have less width.

Figure 3A:
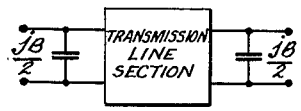
Figure 3A:
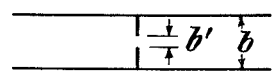

Figure 3 gives the equivalent circuit of Figure 2 only if the strips are sufficiently far apart horizontally so that the field disturbance set up by each does not extend to the adjacent strips. If $b$ is less than $l$, the strips may be considered isolated in the horizontal direction. In a practical lens, however, it is often desirable to have $b$ greater than $l$ in order to increase the vertical separation of the strips and reduce the number of strips in the lens. It may be shown that for $b$ greater than $l$ the interaction of the field disturbances has the effect of decreasing the shunt susceptances for given $b/\lambda$ and $b'/b$ and of introducing bridging capacitive susceptances as shown in Figure 6.

Figure 6:
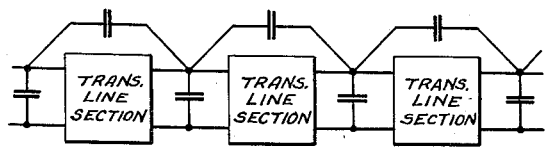
Fig. 6 is an equivalent schematic filter circuit for the condition where the ratio $b/l$ is greater than 1.

Figure 6 assumes direct interaction only between adjacent strips. If interaction between strips spaced $n$ sections apart occurs where $$B_{oc}=\tan\frac{\pi l}{\lambda}+\frac{2b}{\lambda}\log_e \csc\frac{\pi\delta}{2}+\frac{2b}{\lambda}\sum_{n=1}^{\infty}\left[\frac{\tanh\frac{n\pi l}{b}F}{F}-1\right]\frac{\sin^2\pi n\delta}{n(\pi n\delta)^2} \quad (21)$$

$$B_{sc}=-\cot\frac{\pi l}{\lambda}+\frac{2b}{\lambda}\log_e \csc\frac{\pi\delta}{2}+\frac{2b}{\lambda}\sum_{n=1}^{\infty}\left[\frac{\coth\frac{n\pi l}{b}F}{F}-1\right]\frac{\sin^2\pi n\delta}{n(\pi n\delta)} \quad (22)$$

($n=2, 3, 4, \ldots$), the equivalent circuit will be even more complicated. This effect will undoubtedly be slight in practical lens structures and may be neglected. The filter-section parameters and the index of refraction may be expressed in the following form, according to filter theory.

$$Y_I=\sqrt{-B_{oc}B_{sc}} \quad (13)$$

$$\tan\frac{\beta}{2}=\sqrt{-\frac{B_{oc}}{B_{sc}}} \quad (14)$$

Hence, by Equations 3 and 4, $$\eta=\frac{\lambda}{\pi l}\tan^{-1}\sqrt{-\frac{B_{oc}}{B_{sc}}} \quad (15)$$

$B_{oc}$ and $B_{sc}$ are respectively the normalized open and short-circuit susceptances of a half section.

Figure 7A:
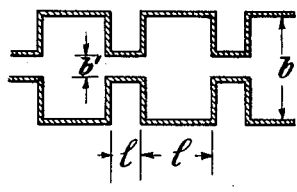
Fig. 7A is a wave guide filter illustrative of the invention.
Figure 7B:
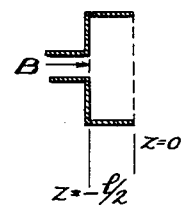
Fig. 7B shows a section of Fig. 7A.

These have been derived for the waveguide filter structure of Figure 7A for $l'$ greater than $b'$. At the plane $z=l/2$ (Figure 7B) they are given by $$B_{oc}=\tan\frac{\pi l}{\lambda}+\frac{2b}{\lambda}\left\{\frac{S_0(\delta)}{\pi^2}-.045\right\}+\frac{2b}{\lambda}\sum_{n=1}^{\infty}\left\{\frac{\tanh\frac{n\pi l}{b}F}{F}-1\right\}\frac{\sin^2\pi n\delta}{n(\pi n\delta)^2} \quad (16)$$

$$B_{sc}=-\cot\frac{\pi l}{\lambda}+\frac{2b}{\lambda}\left\{\frac{S_0(\delta)}{\pi^2}-.045\right\}+\frac{2b}{\lambda}\sum_{n=1}^{\infty}\left\{\frac{\coth\frac{n\pi l}{b}F}{F}-1\right\}\frac{\sin^2\pi n\delta}{n(\pi n\delta)^2} \quad (17)$$

where $$\delta=\frac{b'}{b} \quad (18)$$

$$F=\sqrt{1-\left(\frac{b}{n\lambda}\right)^2} \quad (19)$$

and where $$S_0(\delta)=\sum_{n=1}^{\infty}\frac{\sin^2 n\pi\delta}{\delta^2 n^3} \quad (20)$$

is the Hahn function of zero order. $S_0(\delta)$ is tabulated by Whinnery and Jamieson in Equivalent Circuits for Discontinuities in Transmission Lines, Proc. I. R. E., 32, 98 (February 1944). Equations 16 and 17 are valid for all $l/b$ and for $b/\lambda$ up to approximately 0.9.

In Equation 16 the first term $$\tan\frac{\pi l}{\lambda}$$

is the input susceptance of the open-circuited line of length $l/2$, the second term is the low-frequency value of the step discontinuity susceptance at $z=-l/2$, and the last term takes into account $l/b$ and $b/\lambda$. Similar remarks apply to the terms of Equation 17.

Equations 16 and 17 do not strictly apply to the case of a thin capacitive iris since the discontinuity field of an iris is slightly different from that of a step discontinuity. For the isolated iris of Figure 3C, however, the total shunt susceptance is very nearly equal to twice the susceptance of the single step in Figure 7B, if $b'/b$ is small.

Equations 16 and 17 should apply fairly well to a thin-strip structure even for $b'/b$ large, if the second term of each is replaced by half the low-frequency susceptance of the iris (Equation 6):

Equations 13 and 15 in conjunction with 21 and 22 give the image admittance and index-of-refraction functions of a thin-strip delay lens.

Figure 8:
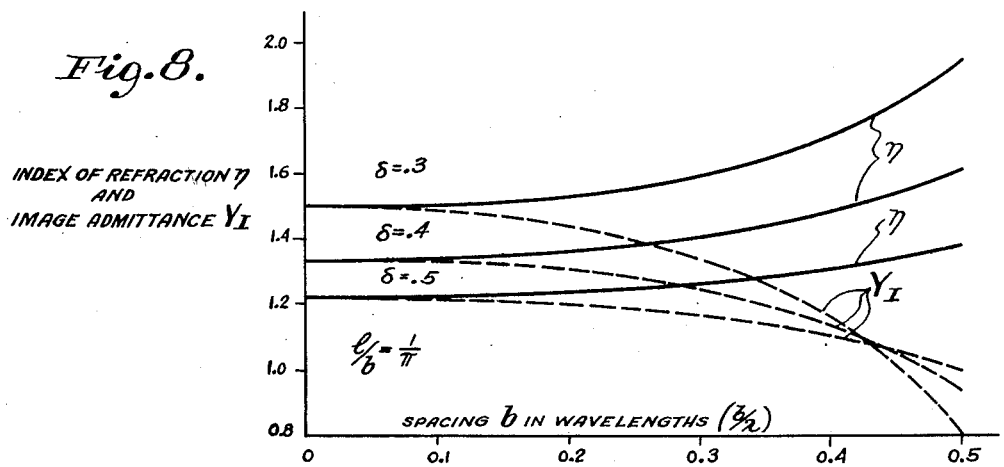
Fig. 8 is a graph explanatory of the invention.

These functions are plotted in Figure 8 for $$l/b=\frac{1}{\pi}$$

There is a wide variety of parameters available for which $Y_I$ is equal to or near unity. Since $b/\lambda$ is proportional to frequency, these equations show the variation of $\eta$ and $Y_I$ with frequency.

The question of proper strip width at the surfaces of the lens (Figure 5) is more complicated than before, since a reduction in strip width affects the bridging susceptances of Figure 6 as well as shunt susceptances. As an approximation, however, the spacing $b'$ at the surfaces may be increased to the value which reduces Equation 6 in half. The reflection which results will be small compared to that if the surface strips were not changed at all.

If the strips are embedded in a material of dielectric constant $K$ which is shaped to the same contour as the strip lens, the index of refraction and $Y_I$ are approximately multiplied by $\sqrt{K}$. The precise values may be calculated from Equations 13 and 15 if in Equations 21 and 22 the free space wavelength $\lambda$ is replaced by $\lambda/\sqrt{K}$, and the right sides are multiplied throughout by $\sqrt{K}$. For polyfoam which has $K$ approximately equal to 1.02, the increase is about one percent.

Although the above study applies specifically to the metal-strip structure, it is also applicable to any delay medium consisting of thin metal obstacles placed uniformly in parallel planes. Examples are arrangements of thin circular disks, ellipses, or rectangles. In such media, an equivalent transmission line may be set up as in Figure 2B. If far enough apart horizontally (roughly $l/b$ greater than 1), the thin metal obstacles behave as simple shunt susceptances, no matter what their shape may be, and hence the equivalent circuit of Figure 3 and the entire development applies exactly. (If the obstacles are not separated sufficiently horizontally, their local field disturbances will not be isolated, and the problem will be more complex.)

Figure 9A:
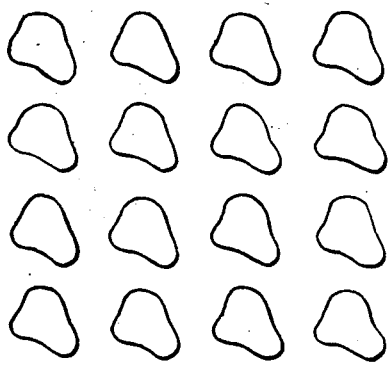
Figs. 9A and 9B are two views of a lens having irregularly shaped segments.
Figure 9B:
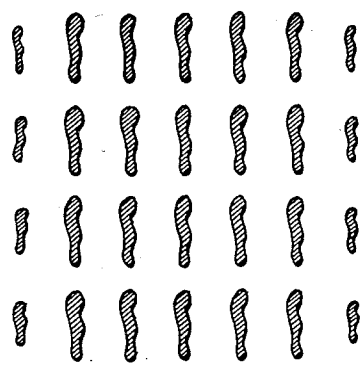

By using discrete segments as shown in Figs. 9A and 9B, one may use incident waves of any polarization. If desired, the index of refraction may be made different for waves having polarizations at right angles to each other.

Such a lens medium may be analyzed by the same method as used for the strip medium once the equivalent circuit of an obstacle in the equivalent transmission line is known. The medium may be matched to space by means of smaller surface segments, as in the case of the metal strip lens.

All that is required to complete the theoretical treatment of any of these structures is a determination of the shunt susceptance of the equivalent iris. Even without this quantity, however, the general conclusion may be drawn that any such media will have $\eta$ and $Y_I$ functions like those of Figure 4. A frequency can always be found, therefore, for which $Y=1$, and hence for which reflections are zero when the surfaces are properly altered.

The metal-strip lens delay medium has been shown to be analogous to a transmission-line low-pass filter. The filter analysis then gives the image phase constant $\beta$ and image admittance $Y_I$ of the equivalent filter section. The index of refraction $\eta$ of the lens is then obtained from the former, and the reflection coefficient $\gamma$ from the latter. Equation 7 shows that when the filter image admittance equals one, then the reflection coefficient equals zero. It was also shown that the physical parameters may be chosen so that the strip medium is perfectly matched to space at a particular frequency. Formulas are given which hold for normal incidence even when the strips are close together. The same method may be applied to delay media consisting of thin metal obstacles of any shape arranged uniformly in parallel planes, for instance circular disks, ellipses, squares, rectangles, and irregular segments.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a delay lens for ultra-high frequency energy transmission, at least two identical groups of parallel conductive strips equally spaced less than a wavelength, each group being in planes spaced less than a wavelength and perpendicular to the directivity axis of said lens, and second groups of parallel conducting strips in planes parallel to and having said equal spacing from the outermost of said first groups, said second groups having strips of a width less than that of the strips of said first groups, whereby the matching of the impedance of said lens to space is maximized.

2. A microwave delay lens comprising a plurality of uniformly spaced parallel conductive strips in at least one parallel plane, and a plurality of second uniformly spaced parallel conductive strips in boundary planes between said first planes and space, the width of said second conductive strips being chosen to provide one-half the susceptance of said first strips, according to the relation, $$B = 4\frac{b}{\lambda} \log_e \csc \frac{\pi b'}{2b}$$

where $\lambda$ = wavelength
$b'$ = spacing of strips in the planes
$b$ = strip width + $b'$
$B$ = susceptance 3. A low-pass microwave delay lens filter comprising a plurality of uniformly spaced conductive segments in at least one parallel plane, said segments having size and spacing less than wavelength, input and output means for said filter comprising a plurality of uniformly spaced conductive segments of smaller size than said first conductive segments.

4. An ultra-high frequency delay lens filter comprising a plurality of uniformly spaced inner and outer conductive segments having size and spacing less than a wavelength, the outer segments of which are smaller in size than the inner segments whereby the filter is matched to space at the operating frequency.

5. A delay lens for ultra-high-frequency energy, comprising a plurality of uniformly spaced conductive segments having size and spacing less than a wavelength, means to make the reflection of received energy from said lens equal to zero, said means comprising a plurality of uniformly spaced conductive segments smaller than said first segments, but spaced equally from said first segments along the lens axis away from said lens center.

6. A metallic delay lens for ultra-high-frequency energy comprising first configurations of equal size conductive segments identically arranged in equally spaced planes perpendicular to said lens axis said size and spacing being smaller than a wavelength, and means to match the impedance of said lens to space comprising second configurations of second conductive elements spaced and arranged identically as said first segments but smaller in size than said first segments, said smaller segments being located between said lens and space in planes parallel to said first planes.

7. A metallic delay lens for ultra-high-frequency energy comprising a first group of spaced parallel conductive strips in a first plane perpendicular to said lens axis, at least one other group of conductive strips arranged identically as said first group and in other planes parallel to said first planes, means to match said lens to space comprising a matching group of conductive strips arranged identically to the strips of said other groups and in parallel planes between said other groups and space, said matching strips having smaller widths than said other strips to thereby match the impedance of said metallic delay lens to space.

8. A lens structure for ultra-high-frequency energy comprising a plurality of first parallel conductive strips arranged in planes perpendicular to said lens axis and means to minimize reflections from said strips comprising a plurality of second parallel conductive strips arranged in planes parallel to said perpendicular planes and located adjacent the input and output surfaces of said lens, said second strips having substantially three quarters the width of said first strips to thereby minimize reflections from said lens.

9. A delay lens for ultra-high-frequency energy having interior and exterior portions comprising at least one interior arrangement of conductive segments in planes perpendicular to said lens axis, an exterior arrangement of conductive segments identical to said interior arrangement in spacing but having smaller size segments, said exterior arrangement being located in a plane parallel to said interior planes and between said interior plane and space.

10. Apparatus as in claim 9 characterized by the fact that the smaller segments are substantially 75±10 percent the size of the larger segments.

11. In lens systems having a metallic delay lens of the type comprising a number of conductive elements having spacing and length less than a wavelength and which obtain focusing by a reduction in the phase velocity of radio waves; input matching means comprising a plurality of conductive elements having the same spacing as said lens elements and arranged in a plane perpendicular to said lens axis, said elements being smaller in size than the elements of the delay lens, and output matching means connected to said delay lens comprising a plurality of conductive elements having the same spacing as said lens elements in a plane perpendicular to said lens axis, said plane being between the output of said delay lens and space and said elements being smaller than the elements in said delay lens.

12. In lens systems having a metallic lens of the type comprising a number of conductive elements having size and spacing small with respect to a wavelength for causing the reduction in the phase velocity of radio waves; input matching means comprising a plurality of conductive input elements arranged in a plane perpendicular to said lens axis and less than a wavelength from said lens input, said elements having substantially one-half the susceptance of the elements of the delay lens, and output matching means connected to said delay lens comprising a plurality of conductive elements arranged in a plane perpendicular to said lens axis, said plane being less than a wavelength from the output of said delay lens and said elements being substantially smaller than the elements in said delay lens.

13. In a microwave lens system, a metallic delay lens of the type comprising a number of conductive elements of size and spacing smaller than a wavelength and which cause a reduction in the phase velocity of radio waves, means to match the input impedance of said lens to space including a plurality of conductive elements arranged identically as said lens elements, but having 75±10 percent the size of said lens elements.

14. A wide band delay lens for ultra-high-frequency energy transmission, comprising a plurality of regularly spaced first conductive segments having size and spacing less than a wavelength and a plurality of second equally spaced conductive segments of smaller size than said first conductive segments and arranged between said first segments and space to prevent reflections of received energy.

15. A filter for ultra-high-frequency energy comprising a delay lens having a plurality of parallel conductive strips arranged in first parallel planes perpendicular to the directivity axis of said lens and means to minimize reflection of energy received from space comprising a plurality of parallel conductive strips of smaller width than said first conductive strips, and arranged in planes parallel to said first planes and contiguous to space.

SEYMOUR B. COHN.

REFERENCES CITED

The following references are of record in the file of this patent:

UNITED STATES PATENTS

| Number | Name | Date |
|---|---|---|
| 2,508,479 | Wheeler | May 23, 1950 |

FOREIGN PATENTS

| Number | Country | Date |
|---|---|---|
| 230,166 | Switzerland | Mar. 16, 1944 |

OTHER REFERENCES

Metallic Delay Lenses, Bell System Technical Journal, vol. 27, pages 58 to 82, January 1948.

Metal Lens Antenna, Proc. IRE, vol. 34, pages 828 to 836, November 1946.